(12) United States Patent
Voigt

(10) Patent No.: US 10,846,577 B2
(45) Date of Patent: Nov. 24, 2020

(54) METHOD FOR PROVIDING INFORMATION IN A MACHINE-READABLE FORM

(71) Applicant: Martin Voigt, Darmstadt (DE)

(72) Inventor: Martin Voigt, Darmstadt (DE)

(*) Notice: Subject to any disclaimer, the term of this patent is extended or adjusted under 35 U.S.C. 154(b) by 162 days.

(21) Appl. No.: 15/772,822

(22) PCT Filed: Nov. 2, 2016

(86) PCT No.: PCT/EP2016/076437
§ 371 (c)(1),
(2) Date: May 2, 2018

(87) PCT Pub. No.: WO2017/076912
PCT Pub. Date: May 11, 2017

(65) Prior Publication Data
US 2018/0322374 A1 Nov. 8, 2018

(30) Foreign Application Priority Data
Nov. 2, 2015 (DE) .......... 10 2015 118 755

(51) Int. Cl.
*G06K 21/06* (2006.01)
*G06K 19/06* (2006.01)
(Continued)

(52) U.S. Cl.
CPC ... *G06K 19/06037* (2013.01); *G06F 16/9554* (2019.01); *G06K 1/12* (2013.01);
(Continued)

(58) Field of Classification Search
CPC ... G06K 19/06037; G06K 7/14; G06K 7/1417
(Continued)

(56) References Cited

U.S. PATENT DOCUMENTS 6,681,055 B1 * 1/2004 Sato .............. G06K 1/121
235/494
2005/0194445 A1 * 9/2005 Takakura .......... G06K 7/10544
235/462.1
(Continued)

FOREIGN PATENT DOCUMENTS

DE 102007061626 A1 6/2009
EP 2617498 B1 3/2015

OTHER PUBLICATIONS

Bee Tagging. In: InfoWissWiki—Das Wiki der Informationswissenschaft. Bearbeitungsstand: Apr. 20, 2011. URL: http://wiki.infowiss.net/index.php?title=Bee_Tagging&oldid=14724 [retrieved on Jun. 3, 2016].
(Continued)

*Primary Examiner* — Ahshik Kim
(74) *Attorney, Agent, or Firm* — Smartpat PLC

(57) ABSTRACT

A method for providing information in a machine-readable form is based on information being allocated a unique database reference identifier consisting of at least one character in an initialization step. In a subsequent generation process step, a 2D identifier matrix is generated. The 2D identifier matrix has cells, each of which is assigned a cell value. The 2D identifier matrix has linear borders for bordering the cells. The borders and the cells are designed such that the cell values can be optically detected by a person. Immediately following the generation of the 2D identifier matrix, the database reference identifier is transmitted to the 2D identifier matrix by marking specified cells of the 2D identifier matrix in the same generation process step. Each character of the database reference identifier is represented by precisely one cell value.

23 Claims, 5 Drawing Sheets

(51) Int. Cl.
  *G06F 16/955* (2019.01)
  *G06K 1/12* (2006.01)
  *G06K 7/10* (2006.01)
(52) U.S. Cl.
  CPC ... *G06K 7/10386* (2013.01); *G06K 19/06009* (2013.01); *G06K 19/06093* (2013.01); *G06K 2019/06253* (2013.01)
(58) Field of Classification Search
  USPC .......................................... 235/494, 462.09
  See application file for complete search history.

(56) References Cited

U.S. PATENT DOCUMENTS

| | | | |
|---|---|---|---|
| 2009/0280886 A1 | 11/2009 | Randhawa | |
| 2018/0213125 A1* | 7/2018 | Takeuchi | H04N 1/6091 |
| 2019/0043151 A1* | 2/2019 | Arce | G06T 1/0028 |

OTHER PUBLICATIONS

Knuchel, T. [et al.]: 2D-Codes—Technologie und Anwendungsbereiche. In: Wirtschaftsinformatik, 2011, 53. Jg., Nr. 1, S. 49-52.

* cited by examiner

METHOD FOR PROVIDING INFORMATION IN A MACHINE-READABLE FORM

TECHNICAL FIELD

The invention relates to a method for providing information in a machine-readable form.

BACKGROUND

A constantly-recurring problem, particularly in courier services, in which a courier personally delivers a shipment, is the identification of the recipient's address while on-site. This identification is made more difficult, among other things, by the fact that, for example, street signs are almost impossible to decipher for a European courier who is supposed to deliver a shipment in Asia. In addition, it is also possible that corresponding street signs or comparable markings to identify the correct address are not present.

In order to improve this situation, it is considered the object of the invention to provide a method by which in particular address information can be provided simply and in a machine-readable form.

SUMMARY

This object is achieved according to the invention through a method for the provision of first information in machine-readable form, wherein the first information, in a first initialization step, is assigned a unique first database reference identifier, consisting of at least one character, wherein, in a subsequent creation operation, a 2-D identifier matrix is created in a identifier matrix creation step, wherein the 2-D identifier matrix comprises cells, each of which is assigned a cell value, wherein the 2-D identifier matrix comprises line-shaped boundaries to demarcate the cells, and wherein the boundaries and the cells are configured such that the cell values can by optically detected by a person, wherein, immediately after the creation of the 2-D identifier matrix, in the same creation operation, the first database reference identifier, in a first identifier transmission step, is transmitted onto the 2-D identifier matrix by the marking of predetermined cells of the 2-D identifier matrix, and wherein each character of the first database reference identifier is represented by exactly one cell value.

In this manner, numerous problems, which arise in particular in the provision of address information are simply solved. Should a courier transport a shipment from Europe to Asia, for example, the recipient can have their address information assigned a unique first databank reference identifier in the first initialization step, as well as have the first database reference identifier, as well as their address information, stored in a database.

Subsequently, the recipient can create the 2-D identifier matrix in the creation operation. For this purpose, the recipient can, for example, either print out the 2-D identifier matrix with a printer, or, in particular in rural Asian areas, in which frequently no printers are available, simply manually draw it. In the same operation, the recipient then transfers the first database reference identifier onto the 2-D identifier matrix, and subsequently affixes the 2-D identifier matrix conspicuously to the building, for example to the entrance door, in which building the recipient would like to receive the shipment. It is certainly also possible, that the recipient applies the 2-D identifier matrix, for example with the help of chalk, directly onto the building wall, or implements other materials or methods to create the 2-D identifier matrix. It is also possible according to the invention that the 2-D identifier matrix is displayed on a suitable electronic display.

Subsequently, the recipient submits the first database reference identifier to the courier or sender, who, on the basis of the first information deposited in the database, seeks out the address of the recipient. In order to now be able to uniquely identify the address on-site, the courier can, for example with a correspondingly set-up smartphone, either scan the 2-D identifier matrix and have it confirmed in this manner or detect the identifier themselves, or, in turn, transmit identifier to the databank, for example per SMS, and have the correct recipient address confirmed. Advantageously, an access authorization, for example of the courier, is verified, prior to the accessing of the database, in order to avoid an unauthorized use of the data deposited in the database.

From the prior art, numerous methods are known to automatically select and decode coded information in matrix codes. These known methods can, in principle, also be adapted such that the manually-created 2-D identifier matrix can automatically be detected. In contrast to the known, automatically detectable matrix codes, the 2-D identifier codes used in the method according to the invention can be manually created, however, and, upon request, also be detected. Owing to the fact that the information is not directly coded in the 2-D identifier matrix, but the database reference identifier is simply transferred uncoded to the 2-D identifier matrix, almost any information can additionally also be made available, even independently of the information amount or the size of the information.

The use of the line-shaped demarcation is necessary to identify the cells in an unambiguous manner. According to the invention, the line-shaped boundary may be solid lines, dotted lines, hatchings of individual cells and the like, for example.

With the help of the method according to the invention any information can certainly be provided. For example, the method according to the invention can also be used for an automated payment operation. For this purpose, payment information can, according to the invention, be shown, for example, on a display in a vending machine, and, with the assistance of a correspondingly set up smartphone, be detected, and the payment transaction can thereby, via known payment methods, simply be initiated and concluded. Unless a detection device for the automatic detection of the 2-D identifier matrix is available, the identifier can, according to the invention, also manually be read by the user, and be transferred to a payment service provider, for example with an SMS, which payment service provider authorizes the payment for the user of the corresponding mobile device on the basis of the identifier.

The above-mentioned object is also achieved via a method for the provision of a first and second information in machine-readable form, wherein the first information, in a first initialization step, is assigned a unique first database reference identifier consisting of at least one character, wherein, in a subsequent first identification transmission step, the first database reference identifier is transferred to the 2-D identifier matrix by the marking of predetermined cells of a 2-D identifier matrix, wherein each character of the first database reference identifier is represented by exactly one cell value, wherein the 2-D identifier matrix comprises cells each of which is assigned a cell value, wherein the 2-D identifier matrix comprises line-shaped boundaries to demarcate the cells, and wherein the boundaries and the cells are configured in such a way that the cell values can be optically detected by a person, wherein in a later second identifier transmission step, a unique second database reference identifier is transferred onto the 2-D identifier matrix by the marking of predetermined cells of the 2-D identifier matrix, wherein the second database reference identifier has been assigned to the second information in a second initialization step.

In this way, it is possible to also provide, besides the first information, the second information by the transmission of the second database reference identifier onto the 2-D identifier matrix occurring at a later time using the 2-D identifier matrix. Basically, the first information and the second information can include any information in this case.

For example, this method can be used with particular advantage in the mail order trade. In the mail order trade, it is common and intended that the buyer of a product has the possibility to return the product to the seller. For this purpose, the sellers often provide the option, on their online platforms, to print out a corresponding return form. This return form includes already all shipment information required for the processing of the shipment by the parcel service as well as by the seller. This information is usually printed on the return form through a bar code or a dot matrix code. The buyer prints this return form and attaches it to the parcel used for the return. If, as usual, the parcel sent by the seller is used for the return shipment, the buyer must take care that the original address information of the buyer applied on the parcel is no longer discernable on the return shipment, in order to prevent a renewed delivery to the buyer themselves.

This process can be simplified significantly by using the method according to the invention. In the first initialization step, the address of the buyer is assigned a first database reference identifier. This assignment usually occurs once, in the mail order trade, for example with the first order of the buyer. In the subsequent distribution of an order, the first database reference identifier is transmitted onto a 2-D identifier matrix in the identifier transmission step, and applied to the parcel. Using the first database reference identifier, the parcel service can retrieve the address of the buyer from the database and deliver the parcel. Reference can be made to the above description in this regard.

If the buyer wants to return the parcel, the buyer can make his or her return request on the online platform of the seller. However, instead of a return form to be printed, merely the second database reference identifier is displayed to the buyer, and the buyer can manually apply this identifier onto the 2-D identifier matrix already used and applied to the parcel. The second database reference identifier is linked with the second information, which, for example, includes the return address as well as further information about the shipment. The second database reference identifier has been generated in the second initialization step after the transmission of the return request.

In order to be able to differentiate the first database reference identifier and the second database reference identifier, it is provided according to the invention that the first database reference identifier and the second database reference identifier are transmitted onto the 2-D identifier matrix using different designation marks. For example, the corresponding cells for marking the first database reference identifier can be identified by crosses, and the cells for marking the second database reference identifier can be identified by circles. In this way, the database reference identifiers can be detected and differentiated from one another in a simple and clear fashion, both automatically and manually.

It is also possible and provided for according to the invention that at least one character of the first database reference identifier also comprises the second database reference identifier, so that at least one cell of the 2-D identifier matrix is marked both in the first identifier transmission step and in the second identifier transmission step. The first database reference identifier and the second database reference identifier can thus each include at least one identical character, so that the respective cell of the 2-D identifier matrix, that represents this character, is marked both in the transmission of the first database reference identifier and in the transmission of the second database reference identifier.

The use of further database reference identifiers can be used, according to the invention, in the method described first here as well. For this purpose, in the first described method, it is provided according to the invention that in a later second identifier transmission step, a unique second database reference identifier is transmitted onto the 2-D identifier matrix by the marking of predetermined cells of the 2-D identifier matrix, wherein the second database reference identifier has been assigned to second information in a second initialization step.

In order to be able to provide the first and/or the second information in a manner as simple as possible and in possibly any location, it is provided according to the invention that the first information and/or the second information is transferred, by a user, to an electronic data processing device, the first information and/or the second information is assigned the first database reference identifier or the second database reference identifier in an automated manner by a correspondingly-configured software module stored and executed in the electronic data processing device, and the first information and/or the second information is stored in a memory of the electronic data processing device together with the first database reference identifier or the second database reference identifier respectively identifying the first information and/or the second information.

For a simple transmission of the first database reference identifier and/or the second database reference identifier onto the 2-D identifier matrix in the creation operation step, it is provided, according to the invention, that the first database reference identifier and/or the second database reference identifier is displayed to the user on a digital electronic display device of the electronic data processing device or an electronic display device of a client which is connected to the electronic data processing device in a data-conductive manner. The client can be a commercially available computer, a smartphone, a cell phone, or any other suitable device.

For the provision of the first and/or second information at possibly any location, it is provided according to the invention that the electronic data processing device is one or multiple servers connected to one another in a data-conductive manner. These servers are, as known from the prior art, configured to provide information from databases and can be accessed or reached via a connection to the internet.

For the generation of the 2-D identifier matrix, it is provided that a not yet used identifier matrix is printed or manually drawn on a suitable medium. In this way, the 2-D identifier matrix can be generated without special demands on the available technology.

In a particularly advantageous configuration of the method according to the invention, it is provided that the first database reference identifier and/or the second database reference identifier is manually transmitted onto the 2-D identifier matrix in the first identifier transmission step or the second identifier transmission step. Owing to the fact that both the 2-D identifier matrix can be manually created and the first and/or second database reference identifier can be manually transmitted onto the 2-D identifier matrix, the method can be used for the provision of information even in regions, where no corresponding printers or the like are available.

For example, the method according to the invention can also be used to address a recipient located in a refugee camp or without access to suitable computer hardware. The residence or the address of the recipient, in particular in refugee camps, is advantageously indicated through GPS coordinates. In this way, shipments can be delivered to recipients almost all over the planet.

In particular in courier services, it is often true that, at short notice, the recipient does not or can not stay at the place that was originally intended for the hand-over of the shipment. This situation can be addressed by means of the method according to the invention in a reliable manner in that the first and/or the second database reference identifier is assigned to other information in response to a corresponding request by a user. In this way, the recipient can change the residence or current location where they want to receive the shipment at short notice.

In order to be able to create the 2-D identifier matrix and also be able to manually detect it, it is provided for according to the invention that the 2-D identifier matrix comprises ten rows and ten columns. Advantageously, the individual cells of the 2-D identifier matrix are identified with successive numbers of with a combination of numbers and letters, comparable with the identification of the squares of a chessboard.

In order that the first and/or the second database reference identifier can be detected by the 2-D identifier matrix in an unambiguous manner, it is provided according to the invention that the cell values of the marked cells are read-out in a specific order. For example, it is provided according to the invention that the individual cells are to be read out row by row from left to right.

In order to display the first and/or second information and be able to confirm the receiving address identified by a courier, it is provided for according to the invention that the first information and/or the second information are read by a correspondingly-configured electronic reader in a detection step, and then transmitted to a data processing device connected to the reader in a data-conductive manner, wherein the electronic data processing device reads the first information or the second information assigned to the first database reference identifier or to the second database reference identifier from the memory, and transmits it to the reader. The reader can be a correspondingly-configured smartphone or the like, for example.

For the automatic detection of the first and/or second database reference identifier, it is advantageously provided that the first database reference identifier and/or the second database reference identifier is detected with a camera device of the reader in an automated manner, and is processed by a correspondingly-configured software module executed in the reader.

In order to be able to provide the first and/or the second information although using a basic cell phone, which can not automatically detect the first or second database reference identifier, it is provided for according to the invention that the first database reference identifier and/or the second database reference identifier is transferred to the reader by the user of the reader through a corresponding input device of the reader. Subsequently, the first or second database reference identifier can, according to the invention, be sent to the data processing device via SMS or by telephone, for example, and the information can be transmitted from the data processing device to the reader likewise via SMS or by telephone.

In a particularly advantageous configuration of the method according to the invention, it is provided that at least one cell of the identifier matrix can comprise orientation marks to specify the orientation of the identifier matrix. In this way, the order in which the cell values of the marked cells must be put together for the first or the second database reference identifier can be specified in an unambiguous manner. Characters located in opposite corners of the 2-D identifier matrix can be used as orientation marks, for example, wherein, according to the invention, an O is used to specify the left upper edge, and an X is used to specify the right lower edge. For a unique specification of the orientation by the X and the O, the cells of the upper right corner and of the lower left corner of the 2-D identifier matrix are not used, according to the invention, to specify the database reference identifier, or the database reference identifier is provided in such a way that these cells do not have to be used.

Further advantageous configurations of the method according to then invention are explained in greater detail by means of exemplary embodiments illustrated in the drawings.

DETAILED DESCRIPTION

Figure 1:
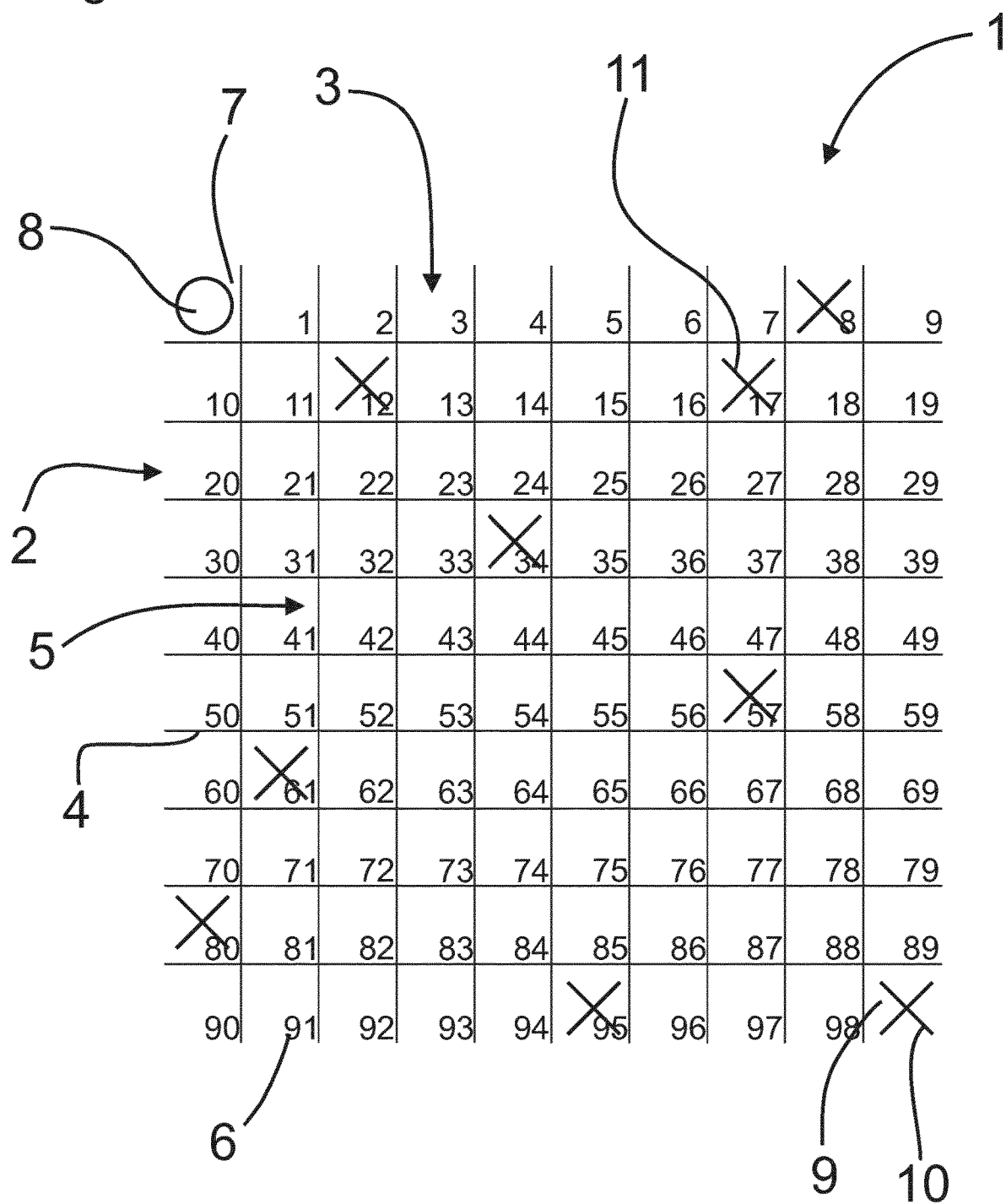
FIG. 1 is a schematic representation of a 2-D identifier matrix with a first database reference identifier.

FIG. 1 shows a 2-D identifier matrix 1 having 10 rows 2 and ten columns 3, wherein the rows 2 and the columns 3 are defined by line-shaped boundaries 4, so that cells 5 are formed by the line-shaped boundaries 4. Cell values 6 ranging between 1 and 98 are assigned to the individual cells 5. In the representation, individual rows 2, columns 3, boundaries 4, cells 5 and cell values 6 are indicated with reference characters.

An upper left cell 7 is marked with an O 8, and a lower cell 9 is marked with an X 10. By the O 8 and the X 10, the upper left corner and the lower right corner of the 2-D identifier matrix 1 and thus the intended orientation of the 2-D identifier matrix are provided.

Individual cells 5 of the 2-D identifier matrix are marked, in the example, also with an X 11, wherein, in the representation, again exemplary, an X 11 is indicated with a reference character. The first database reference identifier, which is predetermined by the marks 121, results from that the 2-D identifier matrix 1 is read line by line starting from the upper left cell 7 marked with O 8 from left to right. In the exemplary illustrated situation, the first database reference identifier is 8 12 17 34 57 61 80 95.

Figure 2:
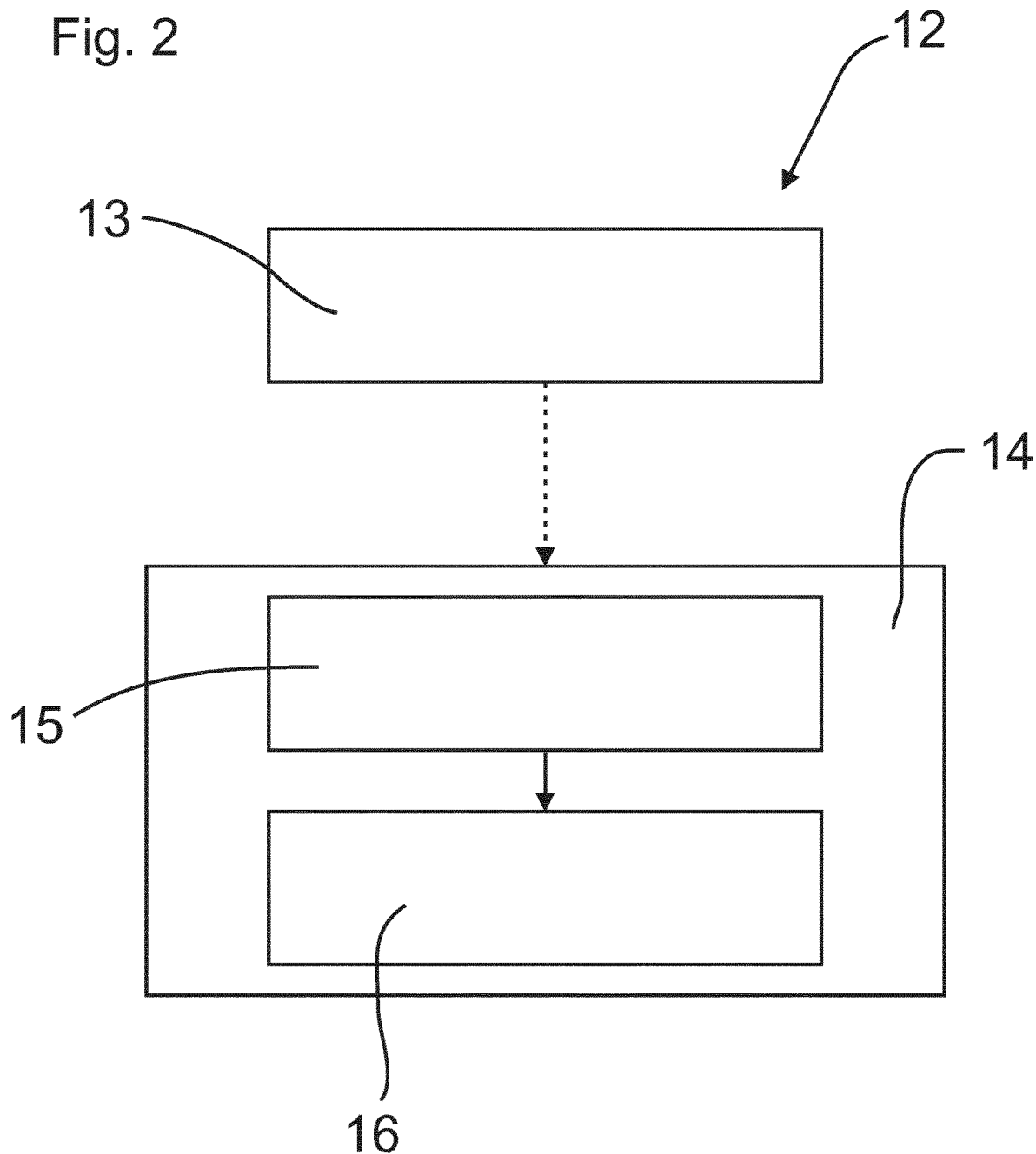
FIG. 2 is a schematically illustrated flow chart of a first variant of the method according to the invention.

In FIG. 2, a flow chart of a first variant of the method 12 according to the invention is schematically shown. In the illustrated variant of the method 12 according to the invention, first, information is assigned a unique first database reference identifier consisting of at least one character in a first initialization step 13. In a subsequent creation operation process 14, first, a 2-D identifier matrix is created in an identifier matrix creation step 15. In the same creation process 14, the database reference identifier is transmitted onto the 2-D identifier matrix by marking predetermined cells of the 2-D identifier matrix subsequently or simultaneously with the identifier matrix creation step 15.

Figure 3:
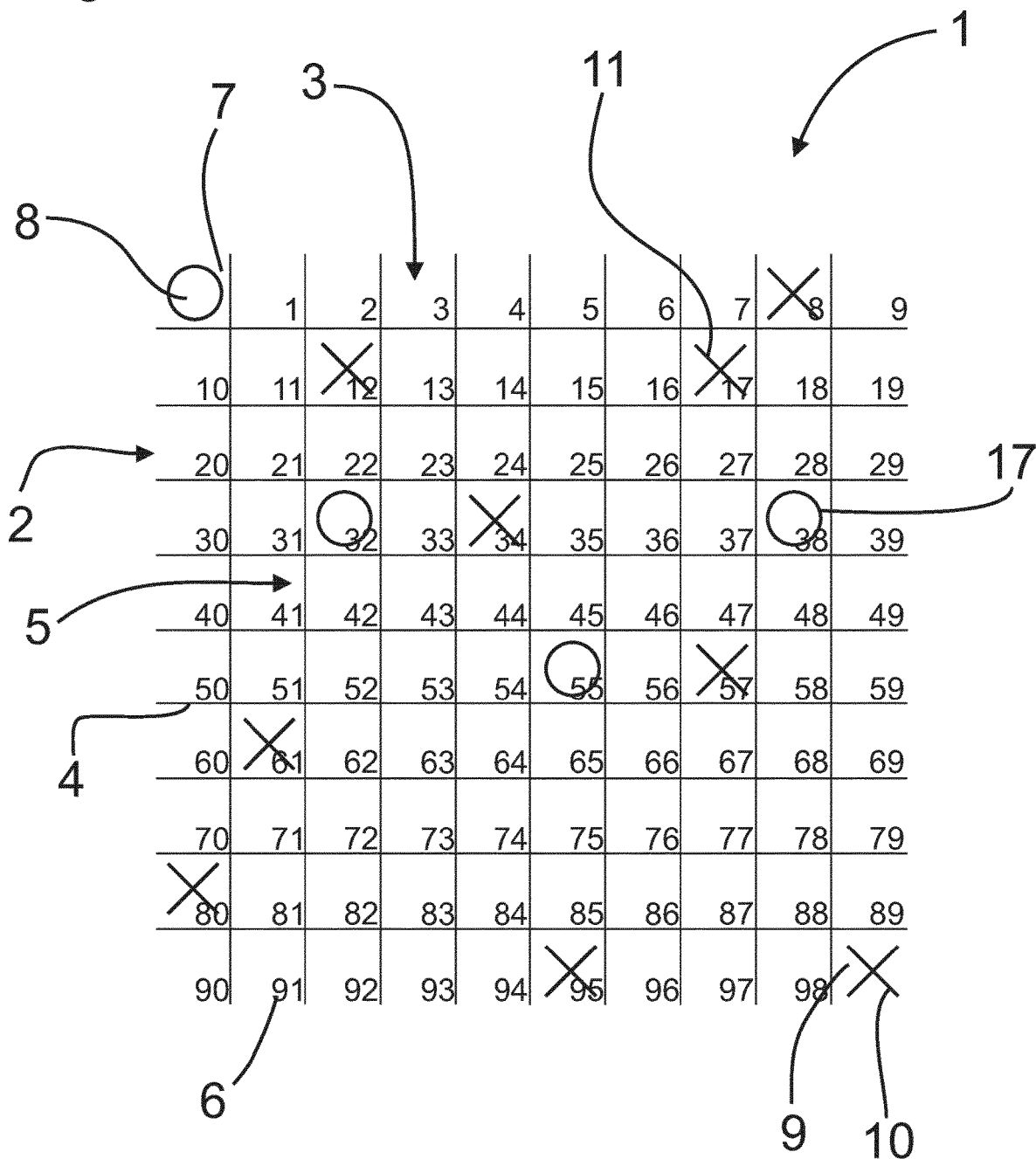
FIG. 3 is a schematic representation of a 2-D identifier matrix with a first and a second database reference identifier.

FIG. 3 shows a schematic illustration of the 2-D identifier matrix 1 shown in FIG. 1, wherein a second database reference identifier is provided by cells 5 marked with O 17. In the representation, again exemplary, an O 11 is indicated with a reference character.

Figure 4:
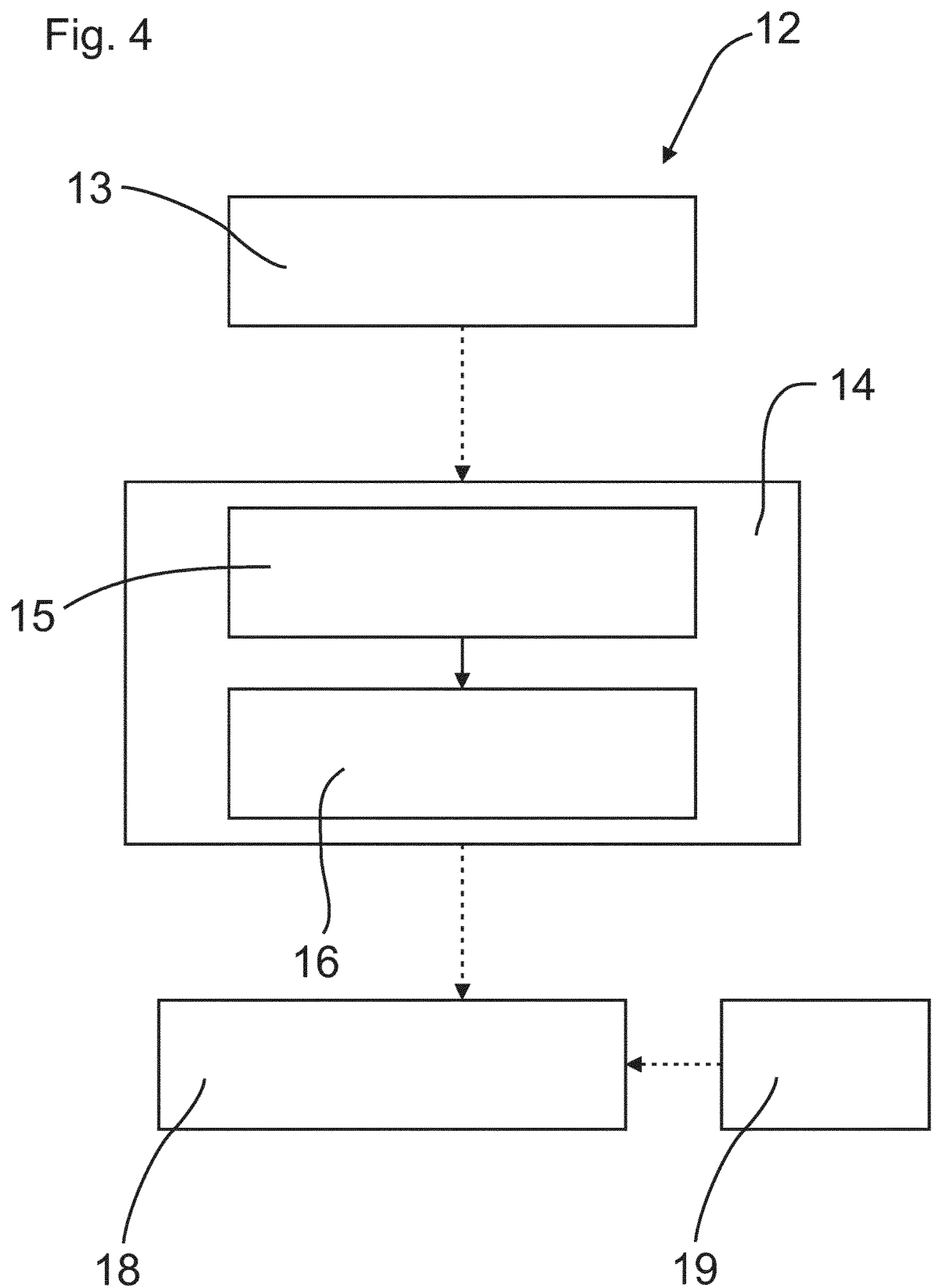
FIG. 4 is a schematically illustrated flow chart of a second variant of the method according to the invention.

FIG. 4 schematically shows a flow chart of a second variant of the method 12 according to the invention. In the second variant, a second identifier transmission step 18 is performed at a later time following the creation process 14, in which the identifier matric creation step 15 and the identifier transmission step 16 is performed, and in which a second database reference identifier is transmitted onto the 2-D identifier matrix by the marking of predetermined cells of the 2-D identifier matrix. The second database reference identifier has been assigned to second information in a second initialization step 19.

Figure 5:
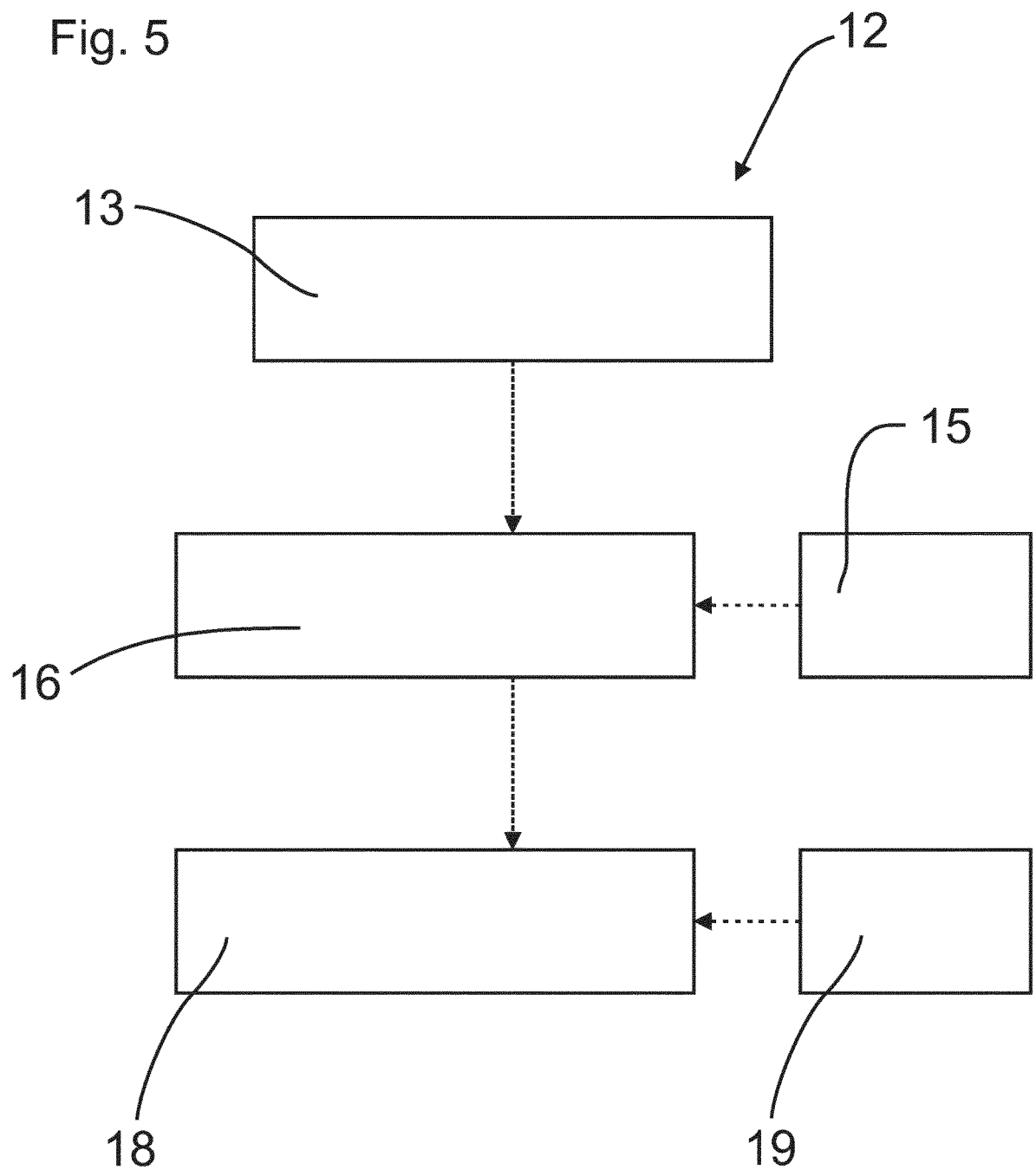
FIG. 5 is a schematically illustrated flow chart of a third variant of the method according to the invention.

FIG. 5 schematically shows a flow chart of a third variant of the method 12. In a first initialization step 13, first information is assigned a first database reference identifier. In a subsequent identifier transmission step 16, the first database reference identifier is transmitted onto the 2-D identifier matrix by the marking of predetermined cells of a 2-D identifier matrix. The 2-D identifier matrix was created in a separate identifier matrix creation step 15 independently from the first identifier transmission step 16. In a later second identifier transmission step 18, the second database reference identifier is transmitted onto the 2-D identifier matrix.

Successive methods steps are indicated with solid arrows in the schematically illustrated flow charts. The dashed arrows indicate time sequences, which can either occur directly one after the other, or likewise with certain periods between them.

The invention claimed is:

1. A method (12) for the provision of first and second information in a machine-readable form,
wherein the first information, in a first initialization step (13), is assigned a unique first database reference identifier, consisting of at least one character,
wherein, in a subsequent creation operation (14), a 2-D identifier matrix (1) is created in a identifier matrix creation step (15),
wherein the 2-D identifier matrix (1) comprises cells (5), each of which is assigned a cell value (6),
wherein the 2-D identifier matrix (1) comprises line-shaped boundaries (4) to demarcate the cells (5), and
wherein the boundaries (4) and the cells (5) are configured such that the cell values (6) can be optically detected by a person, wherein, immediately after the creation of the 2-D identifier matrix (1), in the same creation operation (14), the first database reference identifier, in a first identifier transmission step (16), is transmitted onto the 2-D identifier matrix (1) by marking of predetermined cells (5) of the 2-D identifier matrix (1), and
wherein each character of the first database reference identifier is represented by exactly one cell value (6).

2. The method (12) according to claim 1,
wherein, in a later second identifier transmission step (18), a unique second database reference identifier is transmitted onto the 2-D identifier matrix (1) by marking of predetermined cells (5) of the 2-D identifier matrix (1), and
wherein the second database reference identifier has been assigned to second information in a second initialization step (19).

3. The method (12) according to claim 2,
wherein at least one character of the first database reference identifier also comprises the second database reference identifier, so that at least one cell (5) of the 2-D identifier matrix (1) is marked both in the first identifier transmission step (16) and in the second identifier transmission step (18).

4. The method (12) according to claim 2,
wherein at least one of the first information or the second information is transferred to an electronic data processing device by a user,
wherein the at least one of the first information or the second information is assigned the first database reference identifier or the second database reference identifier in an automated manner by a correspondingly-configured software module stored and executed on the electronic data processing device, and
wherein the at least one of the first information or the second information is stored in a memory of the electronic data processing device together with the first database reference identifier or the second database reference identifier respectively identifying the at least one of the first information or the second information.

5. The method (12) according to claim 4,
wherein the first database reference identifier and/or the second database reference identifier is displayed to a user on a digital-electronic display device of the electronic data processing device or on an electronic display device of a client connected to the electronic data processing device in a data-conductive manner.

6. The method (12) according to claim 4,
wherein the electronic data processing device is one or multiple server(s) connected to one another.

7. The method (12) according to claim 2,
wherein the first database reference identifier and/or the second database reference identifier is manually transmitted onto the 2-D identifier matrix (1) in the first identifier transmission step (16) or the second identifier transmission step (18).

8. The method (12) according to claim 2,
wherein the first database reference identifier and/or the second database reference identifier is assigned to other information in response to a corresponding user request.

9. The method (12) according to claim 4,
wherein the first database reference identifier and/or the second database reference identifier is read by a correspondingly-configured electronic reader in a detection step, and transmitted to a data processing device connected to the reader in a data-conductive manner, and
wherein the electronic data processing device reads, from the memory, the first information or second information assigned to the first database reference identifier or the second database reference identifier, and transmits it to the reader.

10. The method (12) according to claim 9,
wherein the first database reference identifier and/or the second database reference identifier is detected by a camera device of the reader in an automated manner and processed by a correspondingly-configured software module executed on the reader.

11. The method (12) according to claim 9,
wherein the first database reference identifier and/or the second database reference identifier is transferred to the reader manually by the user of the reader through a corresponding input device.

12. The method (12) according to claim 9,
wherein at least one cell (5) of the 2-D identifier matrix (1) comprises orientation identifiers (8, 10) in order to specify the orientation of the 2-D identifier matrix.

13. A method (12) for provisioning of first information in a machine-readable form,
wherein the first information, in a first initialization step (13), is assigned a unique first database reference identifier consisting of at least one character,
wherein in a subsequent first identifier transmission step (16), the first database reference identifier is transmitted onto a 2-D identifier matrix (1) by marking of predetermined cells (5) of the 2-D identifier matrix (1),
wherein each character of the first database reference identifier is represented by exactly one cell value (6),
wherein the 2-D identifier matrix (1) comprises cells (5), each of which is assigned a cell value (6), wherein the 2-D identifier matrix (1) comprises line-shaped boundaries (4) to demarcate the cells (5) and
wherein the boundaries (4) and the cells (5) are configured such that the cell values (6) can be optically detected by a person,
wherein in a subsequent second identifier transmission step (18), a unique second database reference identifier is transmitted onto the 2-D identifier matrix (1) by marking of predetermined cells (5),
wherein the second database reference identifier has been assigned to second information in a second initialization step (19).

14. The method (12) according to claim 13,
wherein at least one character of the first database reference identifier also comprises the second database reference identifier, so that at least one cell (5) of the 2-D identifier matrix (1) is marked both in the first identifier transmission step (16) and in the second identifier transmission step (18).

15. The method (12) according to claim 13,
wherein at least one of the first information or the second information is transferred to an electronic data processing device by a user,
wherein the at least one of the first information or the second information is assigned the first database reference identifier or the second database reference identifier in an automated manner by a correspondingly-configured software module stored and executed on the electronic data processing device, and
wherein the at least one of the first information or the second information is stored in a memory of the electronic data processing device together with the first database reference identifier or the second database reference identifier respectively identifying the at least one of the first information or the second information.

16. The method (12) according to claim 15,
wherein the first database reference identifier and/or the second database reference identifier is displayed to a user on a digital-electronic display device of the electronic data processing device or on an electronic display device of a client connected to the electronic data processing device in a data-conductive manner.

17. The method (12) according to claim 15,
wherein the electronic data processing device is one or multiple server(s) connected to one another.

18. The method (12) according to claim 13,
wherein the first database reference identifier and/or the second database reference identifier is manually transmitted onto the 2-D identifier matrix (1) in the first identifier transmission step (16) or the second identifier transmission step (18).

19. The method (12) according to claim 13,
wherein the first database reference identifier and/or the second database reference identifier is assigned to other information in response to a corresponding user request.

20. The method (12) according to claim 15,
wherein the first database reference identifier and/or the second database reference identifier is read by a correspondingly-configured electronic reader in a detection step, and transmitted to a data processing device connected to the reader in a data-conductive manner, and
wherein the electronic data processing device reads, from the memory, the first information or second information assigned to the first database reference identifier or the second database reference identifier, and transmits it to the reader.

21. The method (12) according to claim 20,
wherein the first database reference identifier and/or the second database reference identifier is detected by a camera device of the reader in an automated manner and processed by a correspondingly-configured software module executed on the reader.

22. The method (12) according to claim 20,
wherein the first database reference identifier and/or the second database reference identifier is transferred to the reader manually by the user of the reader through a corresponding input device.

23. The method (12) according to claim 13,
wherein at least one cell (5) of the 2-D identifier matrix (1) comprises orientation identifiers (8, 10) in order to specify the orientation of the 2-D identifier matrix.

* * * * *